(12) United States Patent
Gavriliuc et al.

(10) Patent No.: US 9,810,261 B1
(45) Date of Patent: Nov. 7, 2017

(54) BEARING

(71) Applicant: Eaton Corporation, Cleveland, OH (US)

(72) Inventors: Sorin Gavriliuc, Caledonia, MI (US); Srinivasan Arjun Tekalur, Okemos, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 15/171,503

(22) Filed: Jun. 2, 2016

(51) Int. Cl.
*F16C 19/30* (2006.01)
*F16C 33/48* (2006.01)
*F16C 33/54* (2006.01)
*F16C 43/06* (2006.01)

(52) U.S. Cl.
CPC ............ *F16C 19/305* (2013.01); *F16C 33/48* (2013.01); *F16C 33/541* (2013.01); *F16C 33/542* (2013.01); *F16C 43/065* (2013.01)

(58) Field of Classification Search
CPC .................................................... F16C 19/305
See application file for complete search history.

(56) References Cited

U.S. PATENT DOCUMENTS

| 1,290,552 | A | * | 1/1919 | Hart ........................ | F16C 19/30 384/623 |
|---|---|---|---|---|---|
| 2,117,633 | A | * | 5/1938 | Smith ..................... | F16C 19/30 384/623 |
| 6,843,605 | B2 | * | 1/2005 | Tamada .............. | F04B 27/1063 384/618 |
| 6,997,297 | B2 | | 2/2006 | Bartley et al. | |
| 7,033,083 | B2 | * | 4/2006 | Obayashi ................ | F16C 33/48 384/619 |
| 2006/0088237 | A1 | * | 4/2006 | Yamamoto ............ | F16C 19/305 384/623 |

* cited by examiner

*Primary Examiner* — Thomas R. Hannon
(74) *Attorney, Agent, or Firm* — Fishman Stewart PLLC

(57) ABSTRACT

A bearing including a base, a plurality of slots, and a plurality of rollers disposed in the plurality of slots. At least one of the plurality of slots may be configured to retain a first roller and a second roller of the plurality of rollers at different skewing angles. Methods for manufacturing bearings are also described. In an embodiment, a method of manufacturing a bearing includes providing a first plurality of base layers. The first plurality of base layers may include portions of a plurality of slots and portions of a plurality of cooling channels. The method may include inserting a roller in at least one of the portions of the plurality of slots and providing a second plurality of base layers.

7 Claims, 8 Drawing Sheets

BEARING

TECHNICAL FIELD

The present disclosure relates generally to bearings, including roller devices and roller thrust bearings.

BACKGROUND

Bearings are used in a wide variety of industries and applications, including in coupling assemblies. Coupling assemblies may be configured as a brake to transmit force which restricts rotation of a member and/or as a clutch to transmit force to cause rotation of a member. Such coupling assemblies include, for example, the coupling assembly disclosed in U.S. Pat. No. 6,997,297, the disclosure of which is hereby incorporated herein in its entirety. Coupling assemblies may include one or more bearing arrangements.

Some bearing arrangements, which may include one or more roller devices, may use an array of planar stages including a number of rollers contained in a retention cage disposed between two surfaces (e.g., thrust races) that may rotate in opposite directions. The rotational axis of each roller may be skewed at a common angle relative to a radial direction of the cage. As power density requirements increase, additional rollers may be added to each stage, but space may limit a total number of rollers than can be used with a particular size of retention cage. During rotation, certain rollers, such as those at outer radial positions, may rotate a greater amount relative to other rollers, such as those disposed at inner radial positions, which may result in sliding and/or skidding. Disposing rollers at larger skewing angles may result in more skidding and/or the effects of friction may increase.

Among other things, the present disclosure addresses one or more of the aforementioned challenges.

SUMMARY

A bearing including a base, a plurality of slots, and a plurality of rollers disposed in the plurality of slots. At least one of the plurality of slots may be configured to retain a first roller and a second roller of the plurality of rollers at different skewing angles. Methods for manufacturing bearings are also described. In an embodiment, a method of manufacturing a bearing includes providing a first plurality of base layers. The first plurality of base layers may include portions of a plurality of slots and portions of a plurality of cooling channels. The method may include inserting a roller in at least one of the portions of the plurality of slots and providing a second plurality of base layers.

BRIEF DESCRIPTION OF THE DRAWINGS

The present invention will now be described, by way of example, with reference to the accompanying drawings, wherein like reference numerals identify like components in the several figures, in which.

DETAILED DESCRIPTION

Reference will now be made in detail to embodiments of the present disclosure, examples of which are described herein and illustrated in the accompanying drawings. While the disclosed concepts will be described in conjunction with embodiments, it will be understood that they are not intended to limit the disclosure to these embodiments. On the contrary, the disclosure is intended to cover alternatives, modifications and equivalents, which may be included within the spirit and scope of the disclosure.

Figure 1:
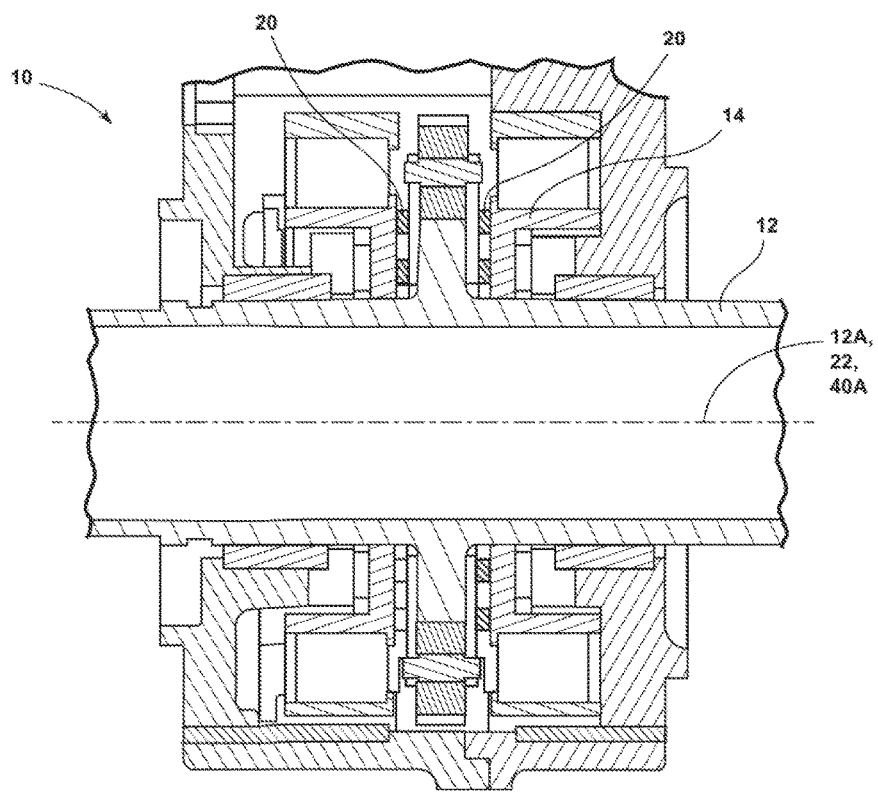
FIG. 1 is a cross-section view of embodiments of bearing according to teachings of the present disclosure.
Figure 2:
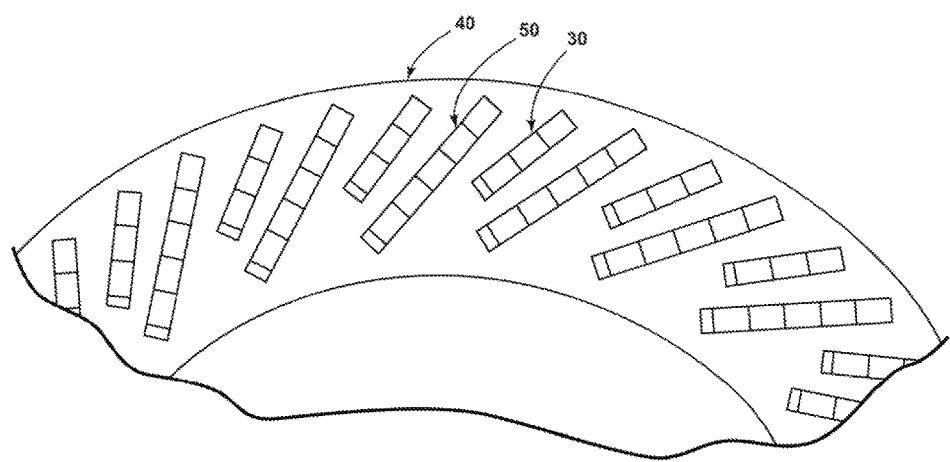
FIG. 2 is a partial side view of an embodiment of a bearing.
Figure 3:
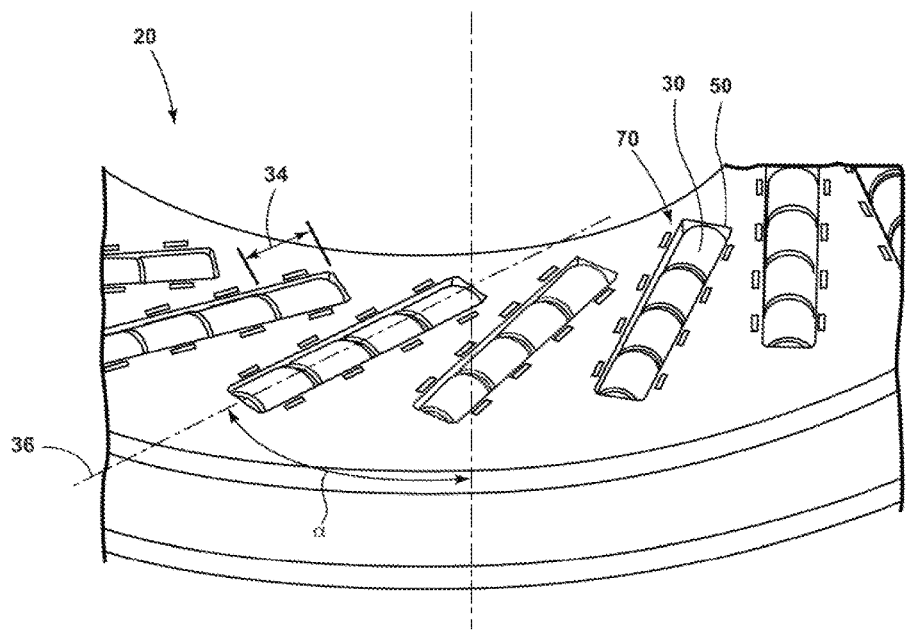
FIG. 3 is a partial perspective view of an embodiment of a bearing.
Figure 4A:
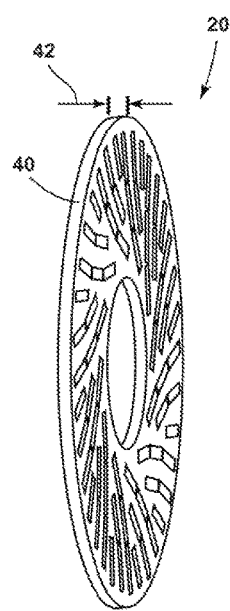
FIGS. 4A and 4B are perspective views of embodiments of bearings embodying teachings of the present disclosure.
Figure 4B:
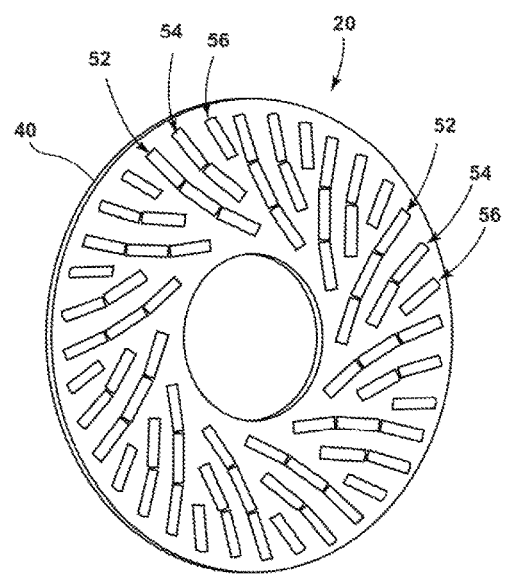

In embodiments, a bearing 20 (e.g., a roller thrust bearing) may be used in wide variety of applications, such as, for example, a coupling assembly 10 such as generally illustrated in FIG. 1. A bearing 20 may be disposed at least partially between a rotating member 12 (e.g., a ball screw, a shaft, etc.) and a stationary member 14 (e.g., a housing) and may facilitate rotation of a rotating member 12 relative to a stationary member 14.

With embodiments, such as generally illustrated in FIGS. 2, 3, 4A, 4B, and 5, a bearing 20 may include one or more rollers 30 and a base/retainer 40. In embodiments, rollers 30 may include one or more of a variety of shapes, sizes, configurations, and/or materials. For example, and without limitation, rollers 30 may have a generally cylindrical shape and may comprise metal. Rollers 30 may be disposed in a plurality of slots 50 (e.g., trapping/retaining slots) of retainer 40 such that portions of rollers 30 extend (e.g., axially) beyond a surface of retainer 40 in a first direction and/or in a second direction (e.g., an outer diameter 32 of rollers 30 may be larger/wider than a thickness 42 of retainer 40). For example, if bearing 20 is disposed between two surfaces (e.g., between rotating member 12 and stationary member 14), rollers 30 may contact one or both of the two surfaces without retainer 40 contacting either surface.

With embodiments, retainer 40 may include one or more of a variety of shapes, sizes, configurations, and/or materials. For example, and without limitation, retainer 40 may include a generally annular/disk shape and/or may comprise one or more metals. Retainer may include a central axis 40A that may be parallel to and/or aligned with a central axis of rotating member 12A and/or with the axial direction 22. Retainer 40 may include one or more slots 50 that may be configured to at least partially receive and/or retain one or more rollers 30. Each slot 50 may be configured to retain one or more rollers 30, and slots 50 may, for example and without limitation, include a generally hexagonal shape. Also for example, and without limitation, in an embodiment a first set 52 of slots 50 may be configured to retain three rollers 30, a second set 54 of slots 50 may be configured to retain two rollers 30, and/or a third set 56 of slots 50 may be configured to retain one roller 30. Rollers 30 may be configured to rotate within slots 50 and may be at least partially restricted from lateral movement. In embodiments, slots 50 may or may not extend all of the way through retainer 40.

In some applications, a ratio of roller length 34 to roller diameter 32 may be limited, such as to maintain sliding stability, such that multiple rollers 30 may be disposed in a common slot 50. Friction may be transformed into and/or result in heat, and the amount of heat may correspond to a combination of thrust force, the coefficient of friction (COF), the friction radius R, and the spinning velocity of the device, which may correspond, for example, to the spinning velocity of rotating member 12. In some applications or embodiments, it may be desirable to balance the heat dissipation of rollers 30 of similar sizes such that they dissipate comparable, similar, and/or substantially the same amount of heat, independent of the friction radii R of the rollers 30. Balancing of the thermal loading of a bearing 20 may include compensating for differences in friction radii R between various rollers 30.

In embodiments, such as for example generally illustrated in FIGS. 2-5, slots 50 may each extend generally in a radial direction, but may be skewed at a skewing angle α relative to a radial direction 24 of bearing 20/retainer 40 such that longitudinal axes 36 of rollers 30 retained by slots 50 may be skewed to some degree relative to a radial direction 24. In embodiments, skewing angle α may, for example, be within the range of about 0 degrees to about 90 degrees. In other embodiments, skewing angle α may, for example, be within the range of about 30 degrees to about 60 degrees. Skewing angle α may, in applications, be about 45 degrees. Moreover, for applications, the skewing angle α may be optimized to provide desired performance characteristics including, for example, friction and/or heat dissipation.

With embodiments, such as generally illustrated in FIGS. 4A, 4B, 5, 6A, 6B, 7A, 7B, and 8, slots 50 may include a plurality of segments (e.g., segments 60, 62, 64) that may each correspond to a roller 30. For example, and without limitation, slots 50 may be configured to at least partially receive three rollers 30 and may include three segments 60, 62, 64. Slots 50 may include two or more segments, which may include an outer segment 60 (e.g., radially), an inner segment 62, and/or one or more middle segments 64. Segments of a particular slot 50 may be disposed at the same (or common) skewing angle α and/or may be disposed at different skewing angles α.

Figure 5:
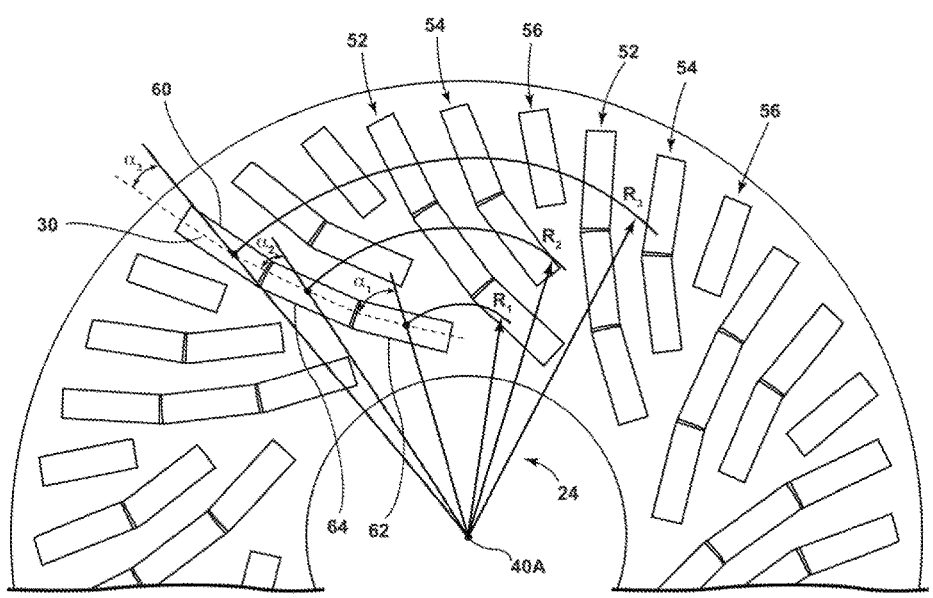
FIG. 5 is a partial side view of an embodiment of a bearing according to teachings of the present disclosure.

In embodiments, segments disposed at outer radial positions/larger friction radii R (e.g., outer segments 60) may be disposed at smaller skewing angles $α_3$ than segments disposed at inner radial positions/smaller friction radii R (e.g., inner segments 62, middle segments 64), for example as generally illustrated in FIG. 5. Skewing angles α of rollers 30 retained/received by slots 50 with such segments may be similarly skewed (e.g., rollers 30 with larger friction radii $R_3$ may include smaller skewing angles $α_3$ than rollers 30 in the same slot 50 with smaller friction radii $R_1$, $R_2$). Providing slot outer segments 60 and/or rollers 30 disposed at outer radial positions with smaller skewing angles $α_3$ may reduce the heat dissipated via such rollers 30 relative to rollers 30 at similar radial positions with larger skewing angles α.

In embodiments, inner segments 62 and/or rollers 30 disposed at inner radial positions $R_1$ may include relatively (at least comparatively within the assembly) large or larger skewing angles $α_1$, which may increase the heat dissipated via such rollers 30 relative to rollers 30 at similar radial positions with smaller skewing angles α. Middle segments 64, which may be disposed radially between outer segments 60 and inner segments 62 (e.g., at or about friction radius $R_2$), may be disposed at skewing angles $α_2$ that are larger than the skewing angles $α_3$ of outer segments 60 and/or that are smaller than skewing angles $α_1$ of inner segments 62. Skewing angles $α_2$ of rollers 30 disposed in middle segments 64 may be larger than the skewing angles $α_3$ of rollers 30 disposed in outer segments 60 and/or may be smaller than skewing angles $α_1$ of rollers 30 disposed in inner segments 62.

As described above, heat dissipation of a bearing 20 may be a function (e.g., a product) of thrust force, the friction radius R, and the coefficient of friction, which may depend on the skewing angle α. The thrust force may be substantially the same for all rollers 30. Disposing slot segments 60, 62, 64 and the rollers 30 therein at skewing angles α that generally decrease with as the friction radius R increases may allow for bearing 20 and/or rollers 30 to more evenly dissipate heat. For example, a decreased skewing angle α for outer segments 60 (and rollers 30 therein) may compensate for a relatively large friction radius $R_3$, and an increased skewing angle α for inner segments 62 (and roller 30 therein) may compensate for a relatively small friction radius $R_1$. Evening/balancing heat dissipation may allow bearing 20 to be used in higher power applications.

In embodiments, such as generally illustrated in FIGS. 3-7B, a bearing may be manufactured in one or more of a variety of ways. One manufacturing method may include disposing metal of a retainer 40 over rollers 30 by staking 70, which may involve trapping rollers 30 in slots 50 (see, e.g., FIG. 5). Although, it is noted that in some instances a staking process may be complicated, may involve expensive dyes, and/or may require an accurate application of staking forces.

Figure 6A:
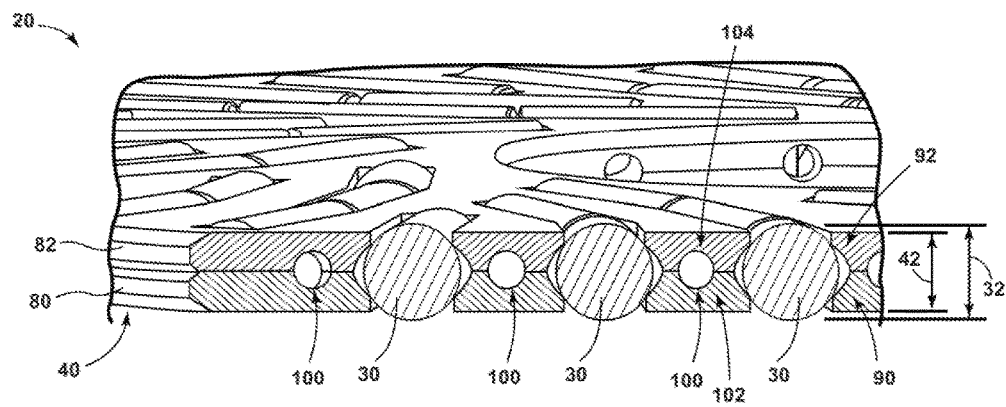
FIG. 6A is a partial perspective view of an embodiment of a bearing embodying teachings of the present disclosure.
Figure 6B:
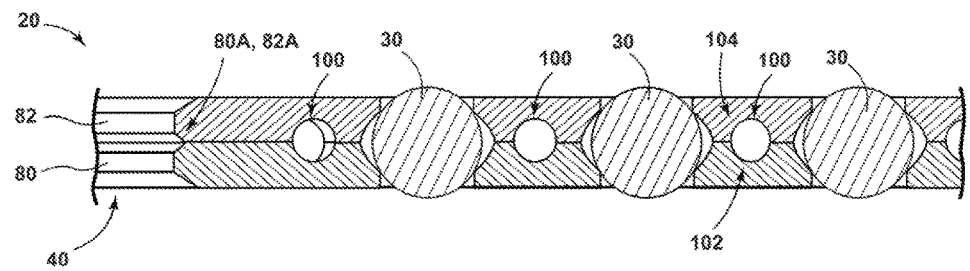
FIG. 6B is a partial cross-sectional view of an embodiment of a bearing in accordance with teachings of the present disclosure.

With embodiments, such as generally illustrated in FIGS. 6A and 6B, a method of making/manufacturing a bearing 20 may include providing a first retainer portion 80 and/or a second retainer portion 82. First and second retainer portions 80, 82 may include one or more of a variety of shapes, sizes, configurations, and/or materials, and the first and second retainer portions 80,82 may or may not include the same or similar configuration. For example, and without limitation, first and second retainer portions 80, 82 may include generally annular plate/disk configurations. Slots 50 may be formed (e.g., machined) in first and second retainer portions 80, 82. For example, and without limitation, lower halves 90 of slots 50 (e.g., apertures which may have a generally trapezoidal cross-sectional shape) may be formed in first retainer portion 80 and upper halves 92 of slots 50 (e.g., corresponding generally trapezoidal-shaped apertures) may be formed in second retainer portion 82. Rollers 30 may be inserted into the lower halves 90 and/or upper halves 92 of slots 50 once lower halves 90 and/or upper halves 92 are formed. Once rollers 30 have been inserted, first retainer portion 80 and second retainer portion 82 may be connected or joined together, such as via welding and/or brazing, to form a retainer 40. First retainer portion 80 and/or second retainer portion 82 may include beveled/chamfered portions 80A, 82A.

In embodiments, such as generally illustrated in FIGS. 6A-7B, a retainer 40 may include one or more channels 100 that may be disposed partially and/or entirely within retainer 40. Channels 100 may extend, for example, generally parallel to a plane defined by the radial and circumferential directions. Channels 100 may be configured to facilitate heat dissipation of a bearing 20. For example, and without limitation, channels 100 may be configured to convey fluid, such as air and/or a liquid lubricant, within retainer 40. In embodiments, a method of manufacturing a bearing 20, such as that described above, may include forming channels 100, or portions thereof, into first retainer portion 80 and/or second retainer portion 82. For example, and without limitation, lower halves 102 of channels 100 (e.g., recesses with a generally semicircular cross-sectional shape, when viewed along a generally radial direction 24) may be formed in first retainer portion 80, and upper halves 104 of channels 100 (e.g., corresponding generally semicircular-shaped recesses) may be formed in second retainer portion 82. Channels 100 may be formed in first retainer portion 80 and/or second retainer portion 82 prior to joining first retainer portion 80 and second retainer portion 82 and, upon joining of first and second retainer portions 80, 82, may include a generally cylindrical shape.

Figure 7A:
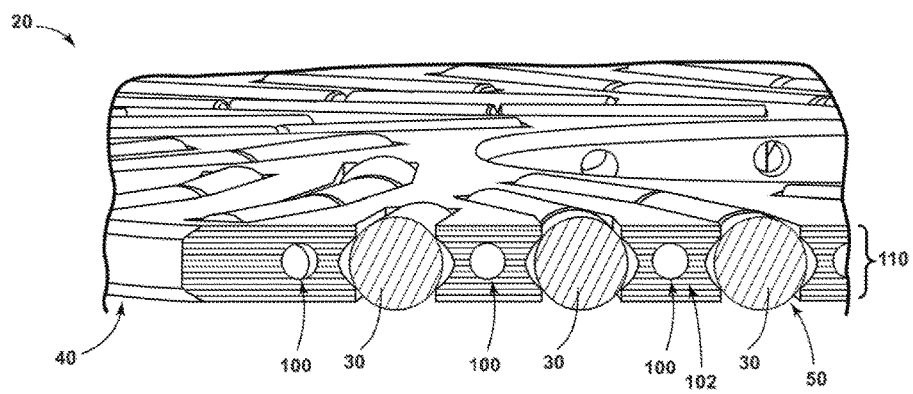
FIG. 7A is a partial perspective view of an embodiment of a bearing embodying teachings of the present disclosure.
Figure 7B:
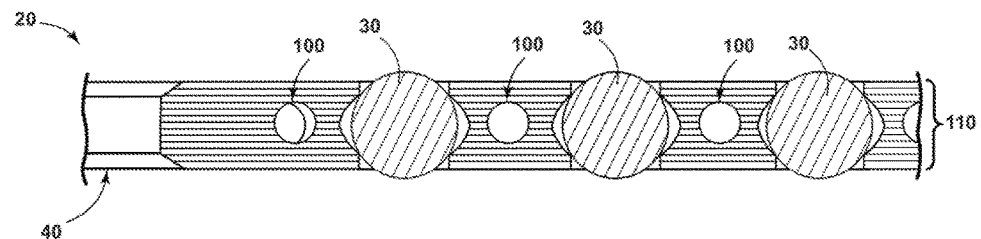
FIG. 7B is a partial cross-sectional view of an embodiment of a bearing in accordance with teachings of the present disclosure.

In embodiments, such as generally illustrated in FIGS. 7A and 7B, a method of manufacturing a bearing 20 may include an additive manufacturing process, such as direct metal laser sintering (DMLS), electron beam processes, and/or ultrasonic additive manufacturing. For example, and without limitation, a manufacturing method may include forming recesses and/or apertures corresponding to slots 50 and/channels 100 into a plurality of thin metal sheets 110. Thin metal sheets 110 may then be progressively joined together (e.g., ultrasonically joined into a stack) to form a retainer 40. Rollers 30 may be disposed in positions corresponding to slots 50 prior to joining thin metal sheets 110, and/or may be disposed in portions of slots 50 (e.g., vertically/in an axial direction 22) once a certain amount (e.g., about half) of thin metal sheets 110 are joined together. A second plurality of thin metal sheets 110 may then be progressively joined together, which may cover rollers 30 and/or complete slots 50.

Figure 8:
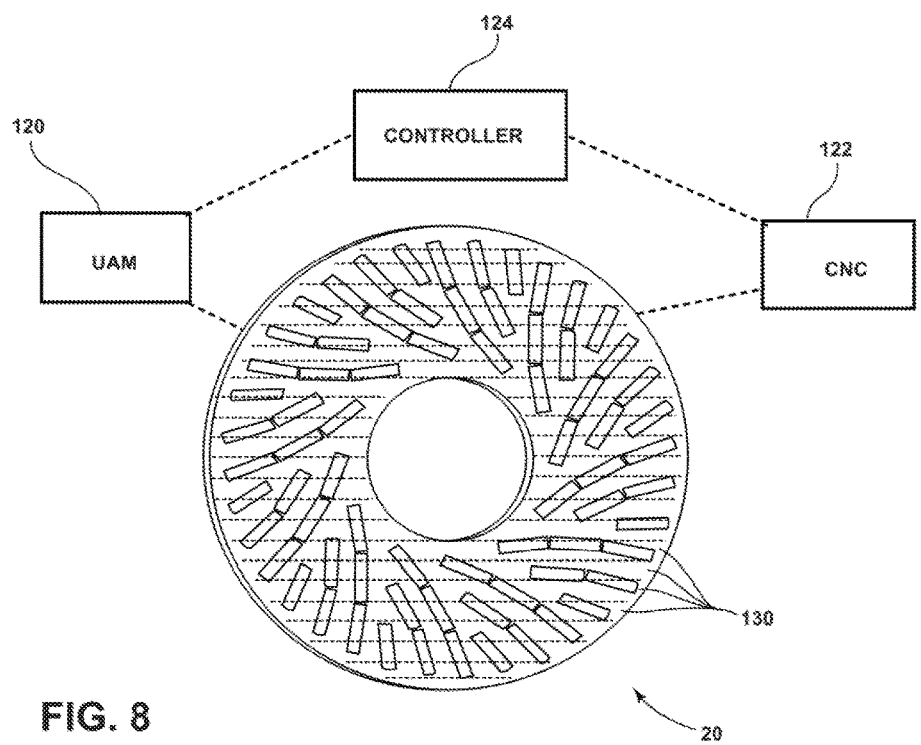
FIG. 8 is a perspective view of an embodiment of a bearing embodying teachings of the present disclosure.

With embodiments, such as generally illustrated in FIG. 8, additive manufacturing may include forming a retainer 40 one layer 130 at a time, such as via an ultrasonic additive manufacturing machine 120 and/or a computerized numerical control (CNC) machine 122 (e.g., a 5-axis CNC machine). In an embodiment, an ultrasonic additive manufacturing machine 120 and a CNC machine 122 may cooperate (e.g., alternate) to form each layer 130, which may include progressively forming slots 50 and/or channels 100 in adjacent layers 130. Layers 130 may be generally planar and/or may include a generally trapezoidal cross-sectional shape (viewed along a radial direction 24 perpendicular to layers 130). Rollers 30 may be inserted (e.g., horizontally/in a radial direction 24) into slots 50 during the formation of layers 130. For example, and without limitation, a roller 30 may be inserted into a nearly-formed slot 50 prior to completing the slot 50 (e.g., before capping off the slot 50 with the next layer 130). A controller 124 may be configured to control operation of ultrasonic additive manufacturing machine 120 and/or CNC machine 122.

In embodiments, controller 124 may include one or more electronic controllers and/or electronic processors, such as a programmable microprocessor and/or microcontroller. In embodiments, controller 124 may include, for example, an application specific integrated circuit (ASIC). Controller may include a central processing unit (CPU), memory, and/or an input/output (I/O) interface. Controller 124 may be configured to perform various functions, including those described in greater detail herein, with appropriate programming instructions and/or code embodied in software, hardware, and/or other medium. In embodiments, controller 124 may include a plurality of controllers and/or may be distributed among various portions of a network.

In embodiments, a bearing 20 may include improved wear characteristics (e.g., of retainer, rollers, etc.), may be compatible with greater rotational speeds, may be compatible with greater pressure/force, and/or may include fewer rollers 30 than conventional designs.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "in embodiments," "some embodiments," "one embodiment," or "an embodiment," or the like, means that a particular feature, structure, or characteristic described in connection with the embodiment is included in at least one embodiment. Thus, appearances of the phrases "in embodiments," "with embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed:

1. A bearing, comprising:
a base including a plurality of slots;
a plurality of rollers disposed in the plurality of slots;
wherein at least one of the plurality of slots is configured to retain a first roller and a second roller of the plurality of rollers at different skewing angles.

2. The bearing of claim 1, wherein the first roller includes a first friction radius, the second roller includes a second friction radius, and the second friction radius is larger than the first friction radius.

3. The bearing of claim 2, wherein the first roller includes a first skewing angle, the second roller includes a second skewing angle, and the first skewing angle is larger than the first skewing angle.

4. The bearing of claim 1, wherein the at least one of the plurality of slots is configured to retain the first roller, the second roller, and a third roller of the plurality of rollers at different skewing angles.

5. The bearing of claim 4, wherein the first roller includes a first skewing angle, the second roller includes a second skewing angle, the third roller includes a third skewing angle, the first skewing angle is larger than the second skewing angle, and the second skewing angle is larger the third skewing angle.

6. The bearing of claim 1, including a third roller, wherein the first roller includes a first friction radius, the second roller includes a second friction radius, the third roller includes a third friction radius, the second friction radius is larger than the first friction radius, and the third friction radius is larger than the second friction radius.

7. The bearing of claim 1, wherein at least one of the plurality of rollers includes a substantially cylindrical shape.

\* \* \* \* \*